United States Patent
Budraitis et al.

(10) Patent No.: US 10,933,820 B1
(45) Date of Patent: Mar. 2, 2021

(54) DEVICE AND METHODS FOR A REMOVEABLE LICENSE PLATE AND ACCESSORY MOUNT

(71) Applicants: Matthew Benjamin Budraitis, San Luis Obispo, CA (US); Kevin Braico, Atascadero, CA (US)

(72) Inventors: Matthew Benjamin Budraitis, San Luis Obispo, CA (US); Kevin Braico, Atascadero, CA (US)

(73) Assignee: EVERYAMP, INC., Atascadero, CA (US)

( * ) Notice: Subject to any disclaimer, the term of this patent is extended or adjusted under 35 U.S.C. 154(b) by 0 days.

(21) Appl. No.: 16/997,244

(22) Filed: Aug. 19, 2020

(51) Int. Cl.
*B60R 13/10* (2006.01)
*B60R 11/04* (2006.01)
*B60R 11/00* (2006.01)

(52) U.S. Cl.
CPC .......... *B60R 13/105* (2013.01); *B60R 11/04* (2013.01); *B60R 2011/004* (2013.01); *B60R 2011/0085* (2013.01)

(58) Field of Classification Search
CPC .................. B60R 13/105; B60R 11/04; B60R 2011/0085; B60R 2011/004; G09F 7/18; G09F 2007/18431; G09F 2007/1865; G09F 2007/1895
See application file for complete search history.

(56) References Cited

U.S. PATENT DOCUMENTS

| | | | |
|---|---|---|---|
| 5,012,602 A | 5/1991 | Storey | |
| 6,757,998 B1 | 7/2004 | Lucatorto | |
| 7,111,420 B2 | 9/2006 | Glickman | |
| 7,401,427 B2 | 7/2008 | Zander | |
| 7,752,785 B2 | 7/2010 | Beer et al. | |
| 7,877,908 B2 | 2/2011 | Collins | |
| 9,440,597 B1 | 9/2016 | Broadwell | |
| 9,725,052 B1 * | 8/2017 | Honaker | F16B 35/005 |
| 10,518,721 B1 * | 12/2019 | Nowakowski | G09F 21/048 |
| 2006/0090380 A1 * | 5/2006 | Zander | B60R 13/105 40/200 |
| 2007/0028490 A1 * | 2/2007 | Beer | B60R 13/105 40/209 |
| 2008/0060239 A1 | 3/2008 | Harp | |
| 2016/0288731 A1 * | 10/2016 | Oh | B60R 11/02 |

FOREIGN PATENT DOCUMENTS

WO          2007030827 A2       3/2007

* cited by examiner

*Primary Examiner* — Cassandra Davis
(74) *Attorney, Agent, or Firm* — Troutman Pepper Hamilton Sanders, LLP; Korbin Blunck; Christopher C. Close, Jr.

(57) ABSTRACT

The disclosed technology includes a mounting device for a motor vehicle. The mounting device can include a base configured to receive a component of a motor vehicle grille, a support bracket affixed to the base and dimensioned to receive an object, and a rotational mounting device attached to the base. The rotation mounting device can include a rotation interface that can be rotatably actuated, mounting brackets configured to attach the base to the motor vehicle grille when in an engaged position, and a plurality of gears. The plurality of gears can be in mechanical communication with the rotation interface and the mounting brackets so that when the rotation interface is rotated between an engaged position and a disengaged position the mounting brackets are also rotated between the engaged position and the disengaged position.

19 Claims, 13 Drawing Sheets

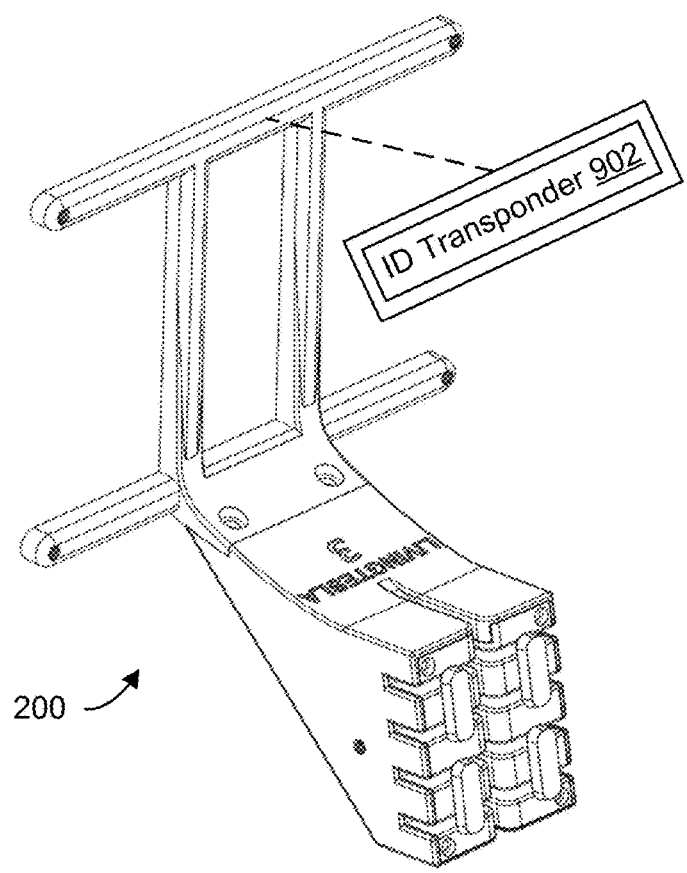
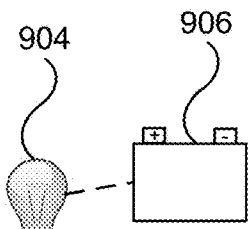
FIG. 9A
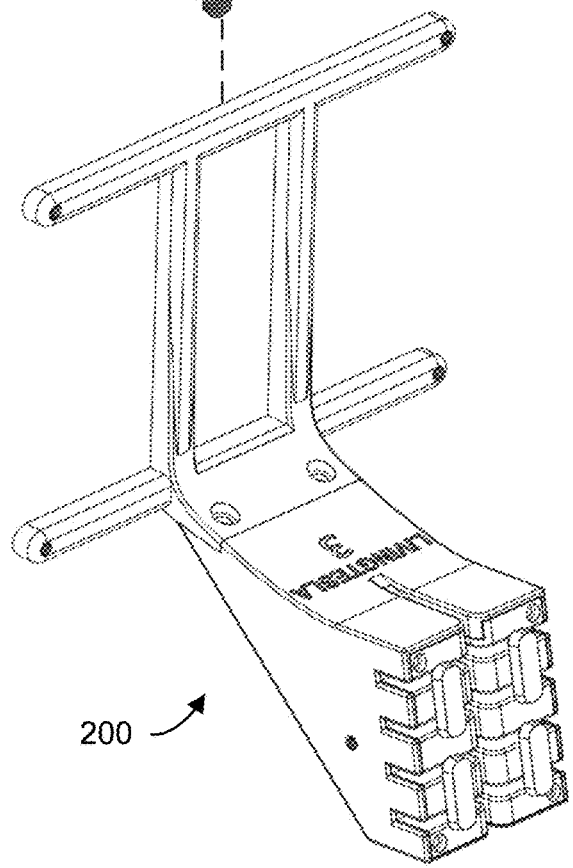
FIG. 9B

DEVICE AND METHODS FOR A REMOVEABLE LICENSE PLATE AND ACCESSORY MOUNT

FIELD OF TECHNOLOGY

The present disclosure relates generally to mounts used for attaching objects to a motor vehicle, and, more particularly, to removeable license plate mounts for attaching a license plate to a motor vehicle.

BACKGROUND

Many jurisdictions require operators of motor vehicles to display a license plate on the motor vehicle to indicate the motor vehicle is licensed for use on public roads. For this reason, many automotive manufacturers include a mount on the rear of the motor vehicle for a license plate to be mounted and displayed at the rear of the motor vehicle. Some jurisdictions also require a license plate be displayed at the front of the motor vehicle. This often requires a mount to be attached to the front of the motor vehicle permanently with bolts, screws, adhesives, or other fasteners drilled into the front bumper resulting in permanent damage to the motor vehicle.

To prevent damaging the front of the motor vehicle, some aftermarket manufactures have created license plate mounts that can be bolted or otherwise fastened to the bumper or grille of the motor vehicle without requiring holes to be drilled into the motor vehicle itself. These aftermarket mounts, however, can be difficult and time-consuming to install because they often require a mounting bracket to be placed behind the grille and fasteners to be installed to hold an outer mount for the license plate. To reduce the necessary installation time, some aftermarket mounts include a bracket that can snap on to the grille of the motor vehicle. These snap-on mounts, however, are often difficult to remove which can lead to further damage to the motor vehicle. Furthermore, because many aftermarket mounts are attached directly to the motor vehicle grille, which is often made of plastic or other relatively weak material, many of these aftermarket mounts can cause damage to the motor vehicle grille when bumped or snagged by someone walking past the front of the motor vehicle, automated car washes, or minor parking accidents.

SUMMARY

The disclosed technology relates generally to mounts used for attaching items to a motor vehicle and, more particularly, license plate mounts for attaching a license plate to a motor vehicle that can be easily installed and removed without damaging the motor vehicle.

The disclosed technology can include a mounting device for a motor vehicle. The mounting device can have a base having one or more slots configured to receive a component of a motor vehicle grille, a support bracket affixed to the base and dimensioned to receive an object, and a rotational mounting device attached to the base.

The rotational mounting device can include a rotation interface that can be rotatably actuatable, a plurality of mounting brackets configured to attach the base to the motor vehicle grille when the plurality of mounting brackets are in an engaged position, and a plurality of gears in mechanical communication with the rotation interface. Each gear in the plurality of gears can also be in mechanical communication with a respective mounting bracket of the plurality of mounting brackets. Furthermore, respective gears of the plurality of gears can be configured to rotate respective mounting brackets of the plurality of mounting brackets between the engaged position and a disengaged position when the rotation interface is rotatably actuated.

The support bracket can be dimensioned to receive a motor vehicle license plate.

The rotation interface can also include a rotation restriction tab and the base further can also include a rotation restriction slot. The rotation restriction slot can be configured to receive the rotation restriction tab and limit a rotational travel of the rotation interface when the plurality of mounting brackets are rotated between the engaged position and the disengaged position.

The plurality of gears can include a first surface and a second surface and the base can include an inner surface. The first surface of the plurality of gears can be configured to contact the inner surface of the base when the plurality of mounting brackets are rotated to the engaged position and the second surface of the plurality of gears can be configured to contact the inner surface of the base when the plurality of mounting brackets are rotated to the disengaged position. In this way, the plurality of gears can be configured to limit a rotational travel of the plurality of mounting brackets when the plurality of mounting brackets are rotated between the engaged position and the disengaged position.

The rotation interface can further include a magnetic device and the base can further include a corresponding magnetic device. The magnetic device and the corresponding magnetic device can be configured to be aligned and exert an attractive force on each other when the plurality of mounting brackets are in the engaged position such that the plurality of mounting brackets can be prevented from moving to the disengaged position when the plurality of mounting brackets are in the engaged position.

The rotation interface can further include a locking mechanism slot and the base can further include a locking mechanism aperture. The locking mechanism aperture and the locking mechanism slot can be configured to receive a locking mechanism when the plurality of mounting brackets are in the engaged position such that the plurality of mounting brackets are prevented, by the locking mechanism, from moving to the disengaged position when the plurality of mounting brackets are in the engaged position. The locking mechanism can be, for example, a threaded fastener. If the locking mechanism is a threaded fastener, the threaded fastener can have a head adapted to receive a unique drive of a screwdriver.

The support bracket can be configured to detach from the base when a force is applied to the support bracket before the component of the motor vehicle grille is damaged.

As an example, the plurality of mounting brackets can be four mounting brackets. Furthermore, the mounting device can further include a light configured to illuminate an object attached to the support bracket. The support bracket can also be dimensioned to receive an identification transponder and/or a camera. Furthermore, the one or more horizontal slots can be four horizontal slots and the one or more vertical slots can be one vertical slot.

The rotation interface can be a knob configured to be rotated by a user such that an outer surface of the rotation interface can be configured to be approximately flush with a surface of the base when the mounting brackets are in the engaged position.

The disclosed technology can also include a mounting device for a motor vehicle that includes a base having one or more slots configured to receive a component of a motor vehicle grille, a support bracket affixed to the base and dimensioned to receive a motor vehicle license plate and rotational mounting device attached to the base. The rotational mounting device can include a rotation interface that can be rotatably actuatable, a mounting bracket configured to attach the base to the motor vehicle grille when the mounting bracket is in an engaged position, a first gear attached to the rotation interface, and a second gear attached to the mounting bracket and in mechanical communication with the first gear. The first gear and the second gear can be configured to rotate the mounting bracket between the engaged position and a disengaged position when the rotation interface is rotatably actuated.

The rotation interface can also include a rotation restriction tab and the base can also include a rotation restriction slot. The rotation restriction slot can be configured to receive the rotation restriction tab and limit a rotational travel of the rotation interface when the mounting bracket is rotated between the engaged position and the disengaged position.

The rotation interface can also include a magnetic device and the base can also include a corresponding magnetic device. The magnetic device and the corresponding magnetic device can be configured to be aligned and exert an attractive force on each other when the mounting bracket is in the engaged position such that the mounting bracket is prevented from moving to the disengaged position when the mounting bracket is in the engaged position.

The rotation interface can also include a locking mechanism slot and the base can also include a locking mechanism aperture. The locking mechanism aperture and locking mechanism slot can be configured to receive a locking mechanism when the mounting bracket is in the engaged position such that the mounting bracket is prevented, by the locking mechanism, from moving to the disengaged position when the mounting bracket is in the engaged position.

The support bracket can also be configured to detach from the base when a force is applied to the support bracket before the component of the motor vehicle grille is damaged.

The disclosed technology can also include a method of attaching a license plate mount to a motor vehicle. The method can include aligning a plurality of support slots of the license plate mount with a grille of the motor vehicle, placing the license plate mount on the grille, actuating a rotation interface to rotate a plurality of mounting brackets of the license plate mount to an engaged position, and inserting a locking device into the license plate mount. The locking device can be configured to prevent the plurality of mounting brackets from rotating from the engaged position to a disengaged position. The locking device can be a threaded fastener.

The license plate mount can further include a plurality of gears in communication with the rotation interface and the one or more mounting brackets. The plurality of gears can be configured to rotate the plurality of mounting brackets between the engaged position and the disengaged position. As an example, the plurality of mounting brackets can include four mounting brackets.

The license plate mount can also include a magnetic device such that actuating the rotation interface to rotate the plurality of mounting brackets of the license plate mount to an engaged position can include rotating the rotation interface until the magnetic device secures the plurality of mounting brackets in the engaged position.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

FIG. 9A and FIG. 9B illustrate a rear isometric view of a license plate mount having alternative objects attached thereto, in accordance with the disclosed technology.

DETAILED DESCRIPTION

Figure 1:
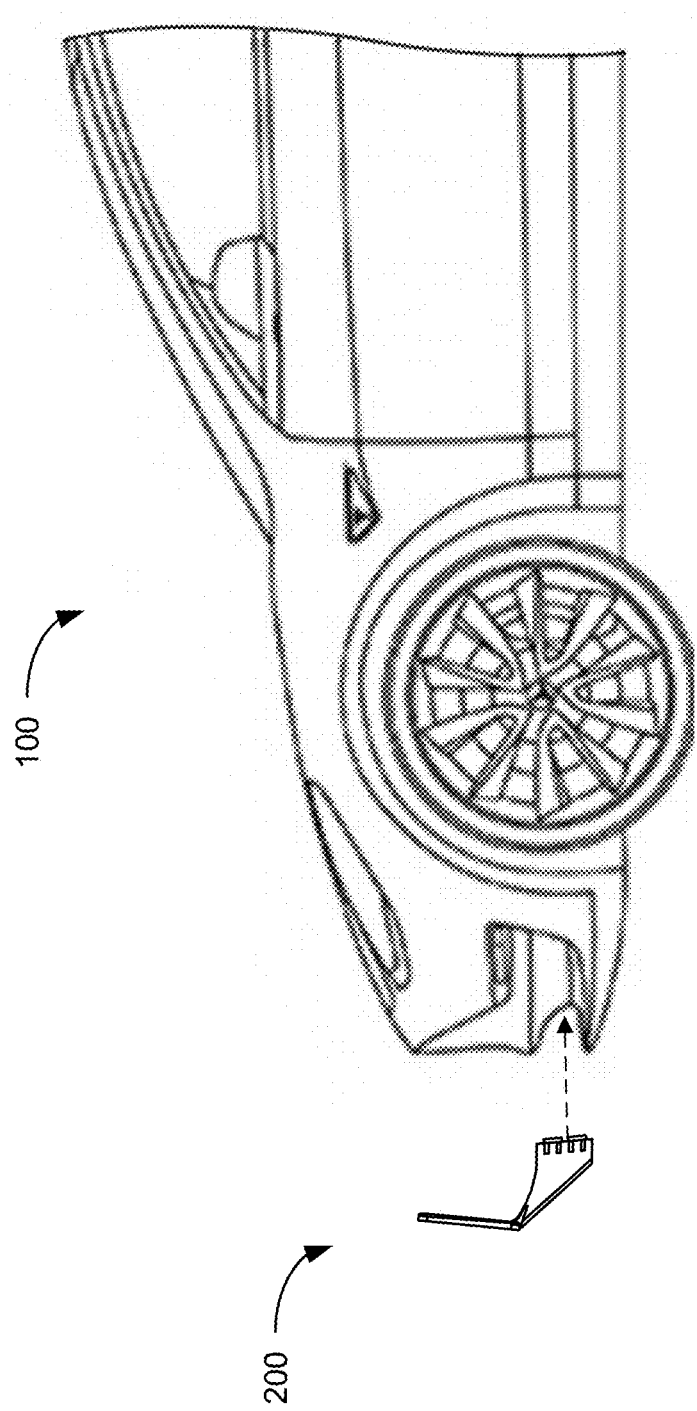
FIG. 1 illustrates a side view of a motor vehicle and a license plate mount, in accordance with the disclosed technology.

The present disclosure relates generally to mounts used for attaching objects to a motor vehicle and, more particularly, to removeable license plate mounts for attaching a license plate to a motor vehicle. The disclosed technology, for example, can include a removeable mount that can be easily attached and detached to the front of a motor vehicle by actuating one or more attachment brackets. The attachment brackets can be rotated from an engaged position to a disengaged position by a series of gears attached to a knob or handle that is rotated by a user. The disclosed technology can further include a locking mechanism configured to lock the license plate mount onto the front of the motor vehicle as well as a magnetic device configured to prevent the mounting brackets of the license plate mount from rotating between an engaged position and a disengaged position.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being a removeable license plate mount for attaching a license plate to a motor vehicle. The present disclosure, however, is not so limited, and can be applicable in other contexts. The present disclosure, for example and not limitation, can include removeable mounts for attaching other objects to a motor vehicle such as a camera, a toll transponder, various sensors, marketing materials, auxiliary lighting, and/or other objects that a user would wish to mount to his or her motor vehicle. Such implementations and applications are contemplated within the scope of the present disclosure. Accordingly, when the present disclosure is described in the context of being removeable license plate mount for attaching a license plate to a motor vehicle, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Furthermore, the components described herein as making up the license plate mount and other various components can all be manufactured of the same materials or be made of different materials. For example, the various components of the license plate mount can be made from various types of plastics, metals, composite materials, wood, rubber, or other suitable materials for the application. Furthermore, the various components of the license plate mount can be made using any suitable additive or subtractive manufacturing process such as 3D printing, injection molding, machining, casting, forming, or any other suitable manufacturing process or combination of manufacturing processes.

Referring now to the drawings, in which like numerals represent like elements, examples of the present disclosure are herein described. As will be described in greater detail, the present disclosure includes a removeable mount for attaching objects to the front of a motor vehicle.

As shown in FIG. 1 the disclosed technology can include a license plate mount 200 configured to attach to the front of a motor vehicle 100. As will become apparent throughout this disclosure, the license plate mount 200 can be configured to attach to the front end of the motor vehicle 100 on or near a grille of the motor vehicle 100. For example, the license plate mount 200 can attach to the front end of motor vehicles 100 having grilles to allow air to pass through the front end of the motor vehicle 100 to provide cooling to various components. The license plate mount 200 can be configured to support a license plate or other object near the front end of the motor vehicle.

As will become apparent throughout this disclosure, the license plate mount 200 can be configured to be easily attached to and detached from the motor vehicle 100 by a user. For example, a user can attach the license plate mount 200 prior to driving on the road to comply with local laws and remove the license plate mount 200 when going through a car wash, at a car show, or other situations where it is preferable to remove the license plate mount 200. The license plate mount 200 can be configured to match the color and contour of the motor vehicle 100 to enhance the aesthetic appeal of the license plate mount 200 and to minimize the license plate mount 200 detracting from the aesthetics of the motor vehicle 100. Furthermore, as will become apparent throughout this disclosure, the license plate mount 200 is not limited in the type of motor vehicle 100 to which it can be attached. For example, the license plate mount 200 can be attached to a sedan, a coupe, a sport utility vehicle (SUV), a truck, a van, a sports car, a recreational vehicle (RV), an off road vehicle, a tractor, a construction vehicle, an emergency vehicle, a bus, or any other motor vehicles having a grille or other components to which a license plate mount 200 can be attached.

Figure 2:
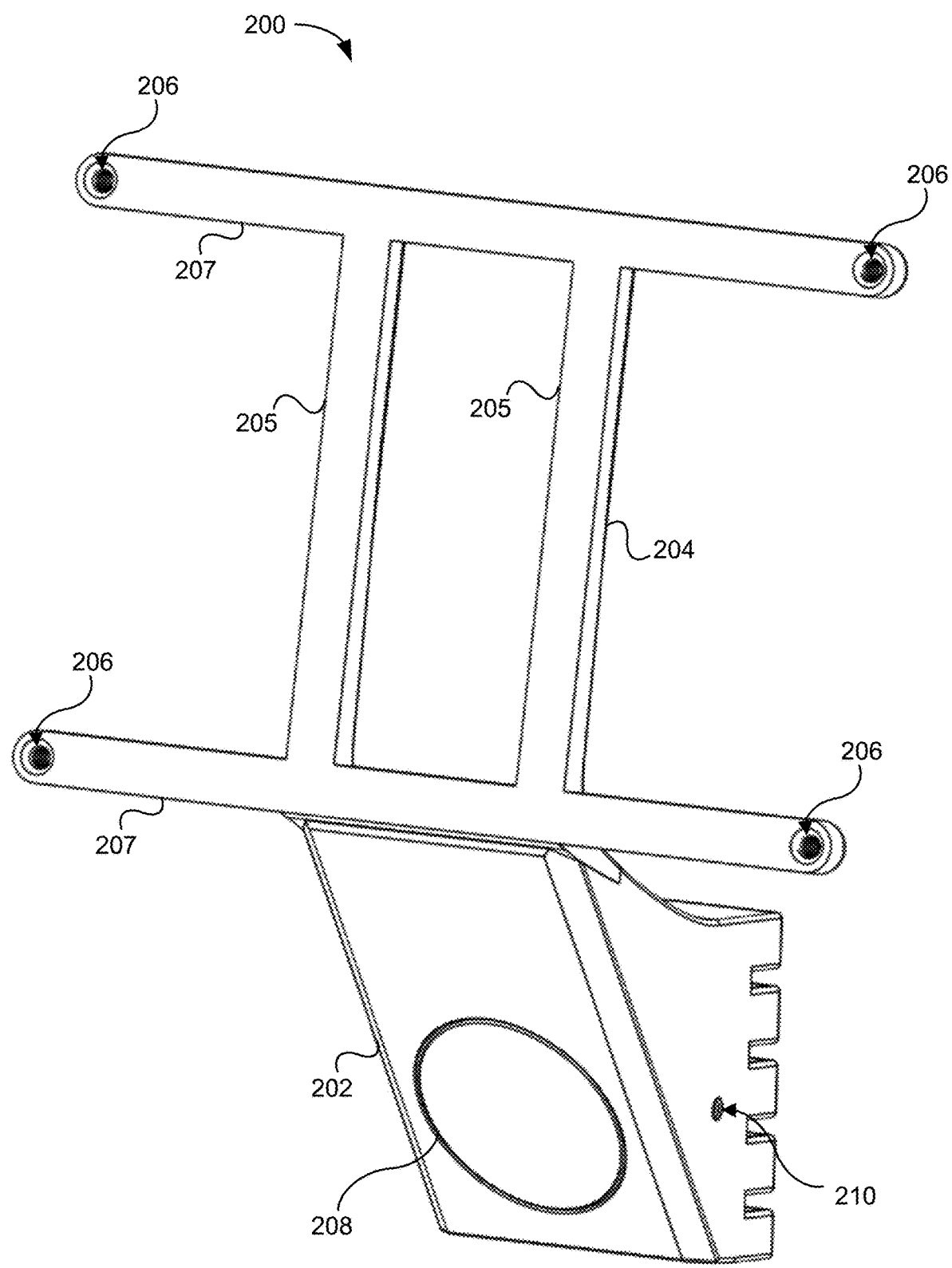
FIG. 2 illustrates a front isometric view of a license plate mount, in accordance with the disclosed technology.

FIG. 2 illustrates a front isometric view of a license plate mount 200, in accordance with the disclosed technology. As depicted in FIG. 2, the license plate mount 200 can generally include a base 202 and a support bracket 204. The base 202, as will be described in greater detail herein, can be configured to attach to the motor vehicle 100 and support the support bracket 204. The support bracket 204, as will also be described in greater detail herein, can be configured to support an object such as a license plate, a camera, an identification transponder (e.g., a toll transponder), various sensors, marketing materials, auxiliary lighting, and/or other objects that a user would wish to mount to his or her motor vehicle. The support bracket 204 can be attached to the base 202 using fasteners, adhesives, magnets, a press fit, a snap fit, or any other suitable means of attaching the support bracket 204 to the base 202. Alternatively, the support bracket 204 can be manufactured with the base 202 such that the support bracket 204 and the base 202 form a single part.

The base 202 can be configured to extend outwardly from the motor vehicle 100 such that the base 202 supports the support bracket 204 in front of, and away from, the front surface of the motor vehicle 100. As will be appreciated, since the base 202 supports the support bracket 204 such that the support bracket 204 does not contact the surface of the motor vehicle 100, the license plate mount 200 can be configured to prevent damage (e.g., paint wear) to the motor vehicle 100.

The license plate mount 200 can be further configured to comprise multiple bases 202 attached to one or more support brackets 204. For example, in cases where it would be desirable to attach a large object to the motor vehicle (e.g., for larger license plates, light bars, a rack of sensors, or other large objects that a user would want to attach to the front of a motor vehicle), the license plate mount 200 can include more than one base 202 attached to the support bracket 204 such that the license plate mount 200 can be attached to the motor vehicle grille in multiple locations.

The support bracket 204 can comprise one or more vertical portions 205 and one or more horizontal portions 207 sized to receive a motor vehicle license plate. For example, the support bracket 204 can comprise two vertical portions 205 and two horizontal portions 207 sized to receive and support a license plate. The support bracket 204 can further comprise one or more license plate mounting holes 206 configured to receive a license plate or other object such that the license plate or other object can be attached to the support bracket 204. The license plate mounting holes 206 can be sized to receive a common threaded fastener, a snap fastener, a cable tie, or other device configured to attach the license plate to the support bracket 204.

The base 202 can be configured to include several components that can facilitate attaching the base 202 to the motor vehicle 100. For example, as depicted in FIG. 2, the base 202 can include a rotation interface 208. The rotation interface 208 can be a component configured to be pulled, pushed, twisted, or otherwise actuated by a user to attach the license plate mount 200 to the motor vehicle 100. For example, the rotation interface 208 can be a handle, a knob, a button, or other component capable of being rotatably actuated by a user to attach the license plate mount 200 to the motor vehicle 100. As an example, the rotation interface 208 can be a knob configured to be pushed or gripped by a user and twisted to attach the license plate mount 200 to the motor vehicle 100. An outer surface of the rotation interface 208 can be configured to be approximately flush with an outer surface of the base 202 when license plate mount 200 is attached to the motor vehicle 100 or otherwise in an engaged position.

Figure 5:
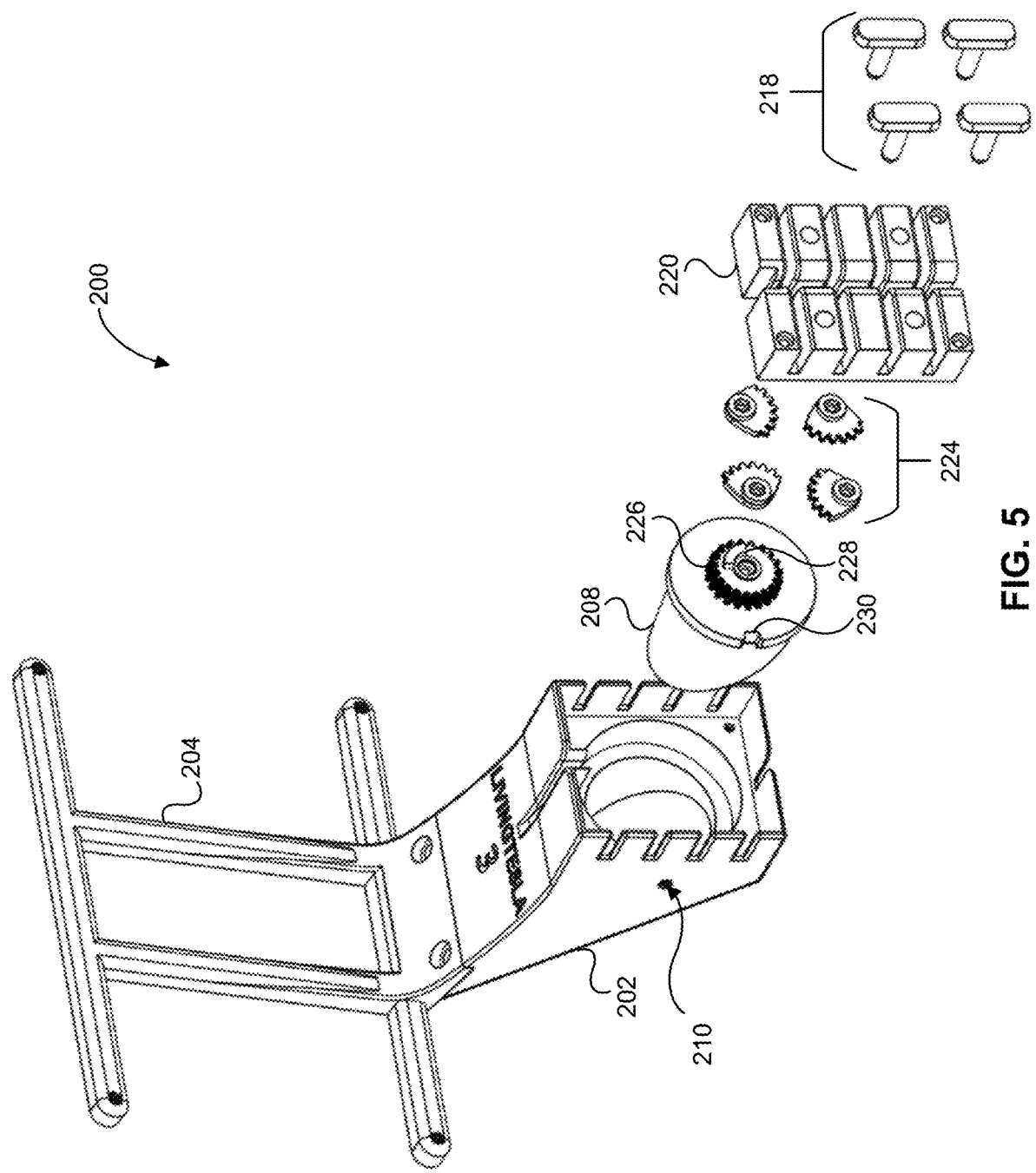
FIG. 5 illustrates a rear exploded view of a license plate mount, in accordance with the disclosed technology.

The base 202 can further include a locking mechanism aperture 210. As will be described in greater detail herein, the locking mechanism aperture 210 can be configured to receive a fastener or other device that can prevent the license plate mount 200 from being detached from the front of the motor vehicle 100. The locking mechanism aperture 210 can be positioned on a side, on the top, or on the bottom of the base 202 and configured to align with a locking mechanism slot 230 of the rotation interface 208 (as depicted in FIG. 5) such that, when a fastener or other device is inserted into the locking mechanism aperture 210, the fastener or other object is in contact with the base 202 and the rotation interface 208. Thus, with the fastener or other object inserted into the locking mechanism aperture 210, the rotation interface 208 is prevented from rotating and the license plate mount 200 cannot be removed from the motor vehicle 100 without the use of excessive force.

Figure 3:
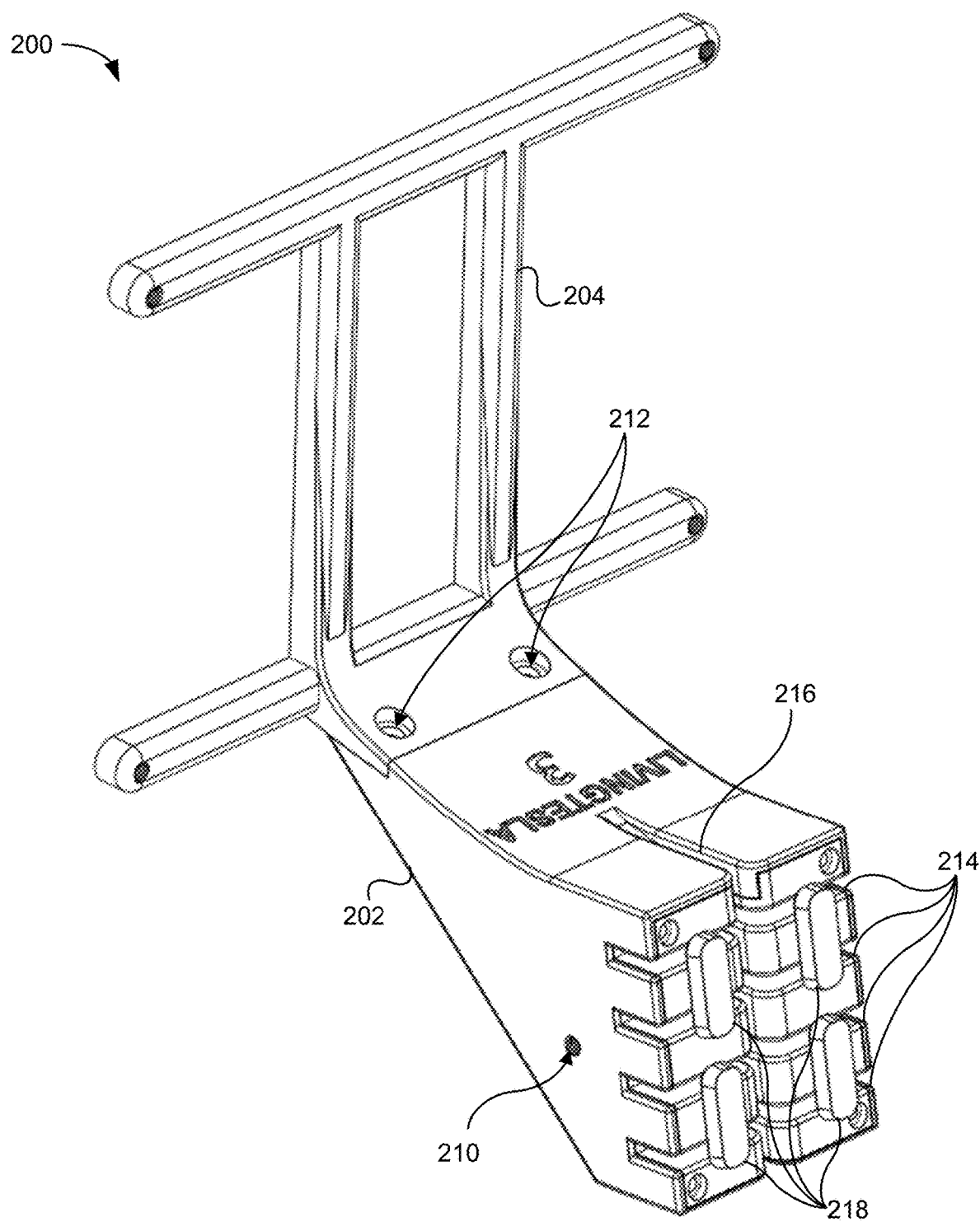
FIG. 3 illustrates a rear isometric view of a license plate mount, in accordance with the disclosed technology.

FIG. 3 illustrates a rear isometric view of a license plate mount 200, in accordance with the disclosed technology. As depicted in FIG. 3, the license plate mount 200 can further include a support bracket mounting screws 212 configured to attach the support bracket 204 to the base 202. Because the support bracket mounting screws 212 can be configured to attach the support bracket 204 to the base, the support bracket mounting screws 212 can allow a user to replace a damaged support bracket 204 with a new support bracket and/or allow a user to attach other objects to the base 202 as will be discussed in greater detail herein.

The base 202 can include horizontal base alignment slots 214 and vertical base alignment slots 216. The horizontal base alignment slots 214 and vertical base alignment slots 216 can be sized and positioned to receive a grille or other mounting surface of various motor vehicles 100. In one example, the horizontal base alignment slots 214 and vertical base alignment slots 216 can be sized and shaped to receive a grille of a sports car. In another example, the horizontal base alignment slots 214 and vertical base alignment slots 216 can be sized and shaped to receive a grille of a truck. As will be appreciated, the horizontal base alignment slots 214 and vertical base alignment slots 216 can be specifically manufactured for the license plate mount 200 to attach to a specific motor vehicle 100. Alternatively, or in addition, the license plate mount 200 can include horizontal base alignment slots 214 and vertical base alignment slots 216 sized and positioned such that the license plate mount 200 is capable of attaching to several different vehicles using the same horizontal base alignment slots 214 and vertical base alignment slots 216.

The base 202 can include multiple horizontal base alignment slots 214 and a single vertical base alignment slot 216 such that the base 202 can be aligned and mounted to a vehicle grille having multiple horizontal grille portions and a single grille portion at the center of the front of the motor vehicle 100. The horizontal base alignment slots 214 can provide vertical support the base 202 when the base 202 is mounted to the motor vehicle 100. On the other hand, the vertical base alignment slots 216 can provide horizontal support to the base 202 when the base 202 is mounted to the front of the motor vehicle 100. In this way, the horizontal base alignment slots 214 and vertical base alignment slots 216 together can help to prevent the license plate mount 200 from moving or sliding along the grille when the license plate mount 200 is mounted to the motor vehicle 100.

The base 202 can further include base mounting brackets 218 configured to help attach the base 202 to the motor vehicle 100. The base mounting brackets 218 can be a single base mounting bracket 218 or a plurality of base mounting brackets 218 depending on the particular application. For example, a smaller license plate mount 200 can include a single base mounting bracket 218 whereas a larger license plate mount 200 can include a plurality of base mounting brackets 218. In some examples, the license plate mount 200 can comprise, two, three, four, five, eight, ten, twenty, or any number of base mounting brackets 218 suitable for the application. As will be described in greater detail herein, the base mounting brackets 218 can be configured to rotate between an engaged position and a disengaged position. In the engaged position, the base mounting brackets 218 can be configured to extend across the horizontal base alignment slots 214 and/or the vertical base mounting slots 216 such that when a grille or other mounting surface of the motor vehicle 100 is in the horizontal base alignment slots 214 and/or the vertical base mounting slots 216, the grille or other mounting surface is prevented from being removed from horizontal base alignment slots 214 and/or the vertical base mounting slots 216. On the other hand, in the disengaged position, the base mounting brackets 218 can be configured to be clear of the horizontal base alignment slots 214 and/or the vertical base mounting slots 216 such that a grille or other mounting surface of the motor vehicle 100 can be removed or inserted into the horizontal base alignment slots 214 and/or the vertical base mounting slots 216. As another example, the base mounting brackets 218 can be configured to be perpendicular to the horizontal base alignment slots 214 and/or the vertical base mounting slots 216 when in the engaged position and parallel to the horizontal base alignment slots 214 and/or the vertical base mounting slots 216 when in the disengaged position.

Figure 4:
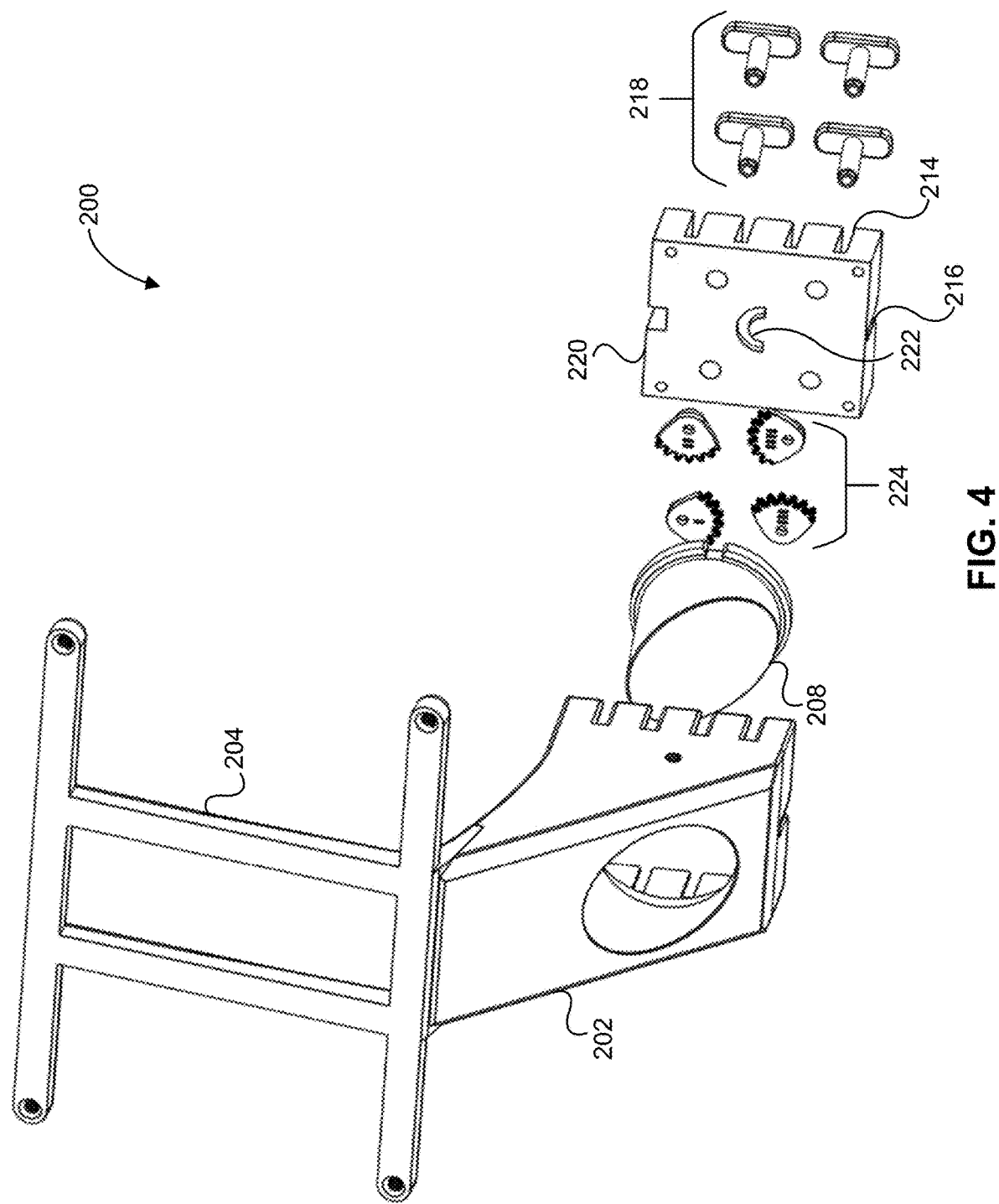
FIG. 4 illustrates a front exploded view of a license plate mount, in accordance with the disclosed technology.

FIG. 4 illustrates a front exploded view of a license plate mount 200, in accordance with the disclosed technology. As depicted in FIG. 4, the base 202 can further include a base end plate 220 configured to attach to an end of the base 202. The base end plate 220 can be configured to enclose additional components of the license plate mount 200 when the base end plate 220 is attached to the base 202. Furthermore the base end plate 220 can comprise holes configured to align the base mounting brackets 218 such that the mounting brackets are capable of attaching the license plate mount to the motor vehicle 100 as described herein.

The base end plate 220 can include the horizontal base alignment slots 214 and the vertical base alignment slots 216 previously described. If the base end plate 220 comprises the horizontal base alignment slots 214 and the vertical base alignment slots 216, the horizontal base alignment slots 214 and the vertical base alignment slots 216 on the base 202 and the base end plate 220 can be configured to align when the base end plate 220 is attached to the base 202.

The base end plate 220 can further include a rotation restriction slot 222 configured to restrict a rotational movement of the rotation interface 208. As will be described in greater detail herein, the rotation restriction slot 222 can be configured to receive a rotation restriction tab 228 (as depicted in FIG. 5) of the rotation interface 208 such that, when the base end plate 220 and the rotation interface 208 are assembled with the base 202, the rotation restriction tab 228 inserts into the rotation restriction slot 222. In this way the rotation restriction slot 222 can define an extent of rotational travel of the rotation interface 208. For example, the rotation restriction slot 222 can define the rotational travel of the rotation interface 208 to correspond to the engaged position of the base mounting brackets 218 at one end of the rotation restriction slot 222 and the disengaged position of the base mounting brackets 218 at the other end of the rotation restriction slot 222. Furthermore, as will be appreciated, the base end plate 220 can be attached or affixed to the base 202 by fasteners, adhesives, a press fit, or any other suitable means of attachment for the application.

As depicted in FIG. 4, the license plate mount 200 can further include outer gears 224 configured to attach to an end of the base mounting brackets 218. By attaching to the end of the base mounting brackets 218, the outer gears 224, when actuated by the rotation interface 208, can rotate the base mounting brackets 218 between the engaged position and the disengaged position. The outer gears 224 can comprise a single outer gear 224 or a plurality of outer gears 224 depending on the particular application. For example, the outer gears 224 can comprise a single outer gear 224 for license plate mounts 200 having a single base mounting bracket 218. As another example, the outer gears 224 can comprise a plurality of outer gears 224 for license plate mounts 200 having a plurality of base mounting brackets 218. In one example, the outer gears 224 can comprise four outer gears 224 configured to attach to four base mounting brackets 218. The outer gears 224 can be sized to fit inside of the base 202 when the base end plate 220 is attached. Furthermore, the outer gears 224 can be configured with gear teeth along an entire outer edge of the outer gears 224 or along only a portion of the outer edge of the outer gears 224 that is necessary to allow complete travel of the base mounting brackets 218 between the engaged position and the disengaged position. Furthermore, the outer gears 224 can be configured to contact an inner surface of the base 202 such that the outer gears 224 can limit the rotational travel of the mounting brackets 218. For example, a first surface of the outer gears 224 can be sized to contact, or nearly contact, an inner surface of the base 202 when the mounting brackets are rotated to the engaged position and a second surface of the outer gears 224 can be configured to contact, or nearly contact, the inner surface of the base 202 at a different location when the mounting brackets 218 are rotated to the disengaged position.

FIG. 5 illustrates a rear exploded view of a license plate mount 200, in accordance with the disclosed technology. As can be seen in FIG. 5, the rotation interface 208 can further include a center gear 226 configured to align with the outer gears 224 when assembled together. When the license plate mount 200 is assembled, the center gear 226 can be configured to cause the outer gears 224 and the base mounting brackets 218 to rotate when the rotation interface 208 is actuated. The center gear 226 can comprise gear teeth along the entire outer perimeter of the center gear 226 such that the center gear 226 can engage all outer gears 224 simultaneously. Thus, the center gear 226 can actuate all outer gears 224 from between the engaged position and the disengaged position simultaneously.

As described previously, the rotation interface 208 can further include a rotation restriction tab 228 configured to align with the rotation restriction slot 222 of the base end plate 220. The rotation restriction tab 228 can be sized to insert into the rotation restriction slot 222 while allowing enough room within the rotation restriction slot 222 such that the rotation restriction tab 228 is able to move within the rotation restriction slot 222. As will be appreciated, the rotation restriction tab 228 can be sized such that the rotation restriction tab 228 can contact an end of the rotation restriction slot 222 corresponding to the engaged position of the base mounting brackets 218 and contact the other end of the rotation restriction slot 222 corresponding to the disengaged position of the base mounting brackets 218.

The rotation interface 208 can further include a locking mechanism slot 230 configured to receive a fastener or other device inserted into the locking mechanism aperture 210 when in the engaged position. As described previously, the locking mechanism slot 230 can be configured to prevent the rotation interface 208 from rotating when a fastener or other device is inserted into the locking mechanism aperture 210 and the locking mechanism slot 230. In this way, the license plate mount 200 can be locked into the engaged position when the license plate mount 200 is mounted on the motor vehicle 100. As previously described, by locking into the engaged position, the license plate mount 200 can be securely attached to the front of the motor vehicle 100 such that the license plate mount 200 is unlikely to fall off while driving or be removed by a thief.

Figure 6:
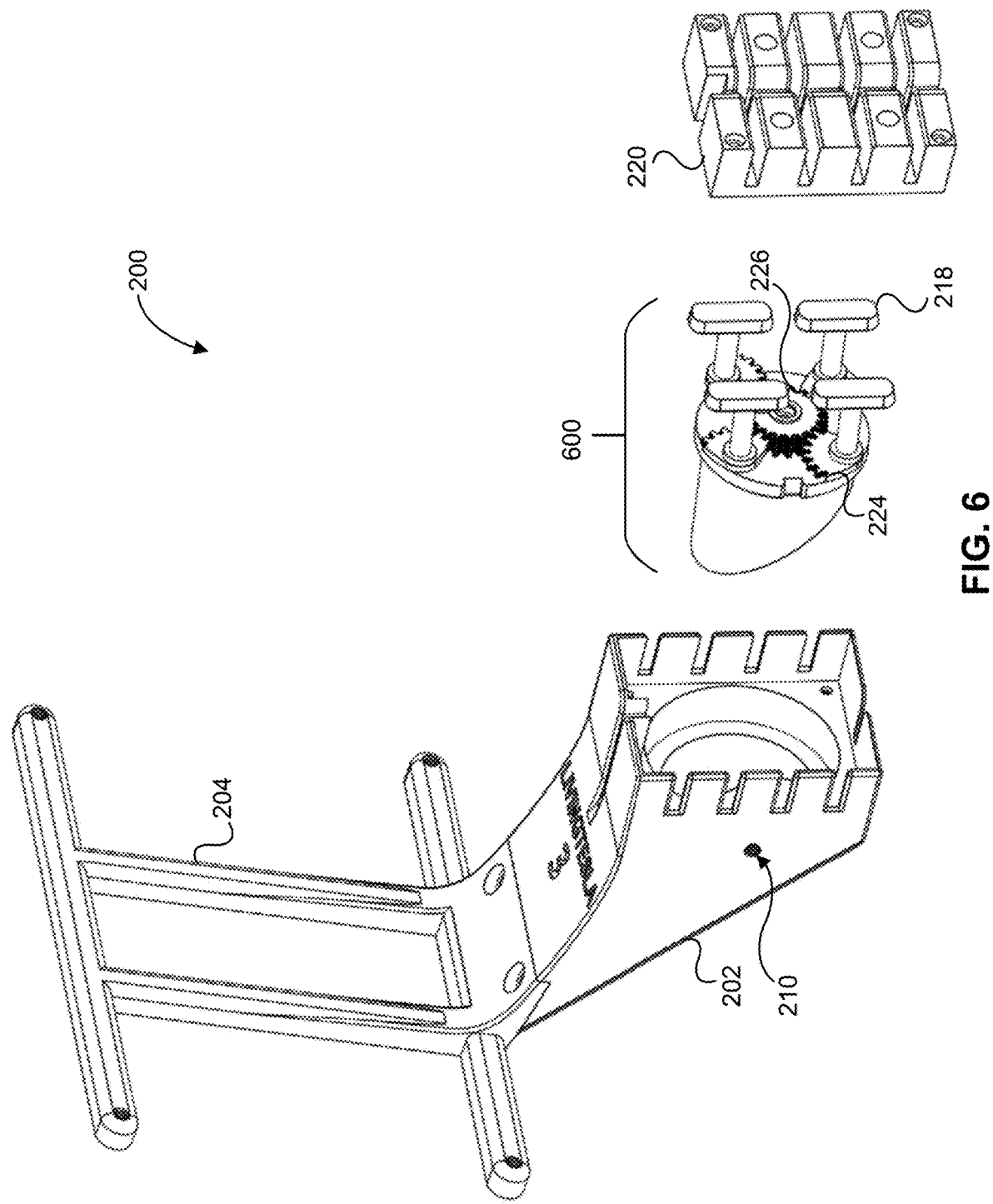
FIG. 6 illustrates a rear exploded view of a license plate mount with an assembled mounting gear assembly, in accordance with the disclosed technology.

FIG. 6 illustrates a rear exploded view of a license plate mount 200 with an assembled mounting gear assembly 600, in accordance with the disclosed technology. FIG. 6 shows the assembled mounting gear assembly 600 with the base end plate 220 removed for explanatory purposes. But as will be appreciated and as previously described, the base mounting brackets 218 can be configured to be inserted through holes of the base end plate 220 when the license plate mount 200 is fully assembled.

As can be seen in FIG. 6, the assembled mounting gear assembly 600 can be configured such that the based mounting brackets 218 are attached to the outer gears 224. Furthermore, the outer gears can be positioned and aligned such that the center gear 226 contacts the outer gears 224 and can actuate the outer gears 224 and the base mounting brackets 218 when the rotation interface 208 is rotated. Furthermore, as can be seen in FIG. 6, the outer gears can be aligned such that only the portion of the outer gears 224 having gear teeth can be in contact with the center gear 226 when assembled.

Figure 7A:
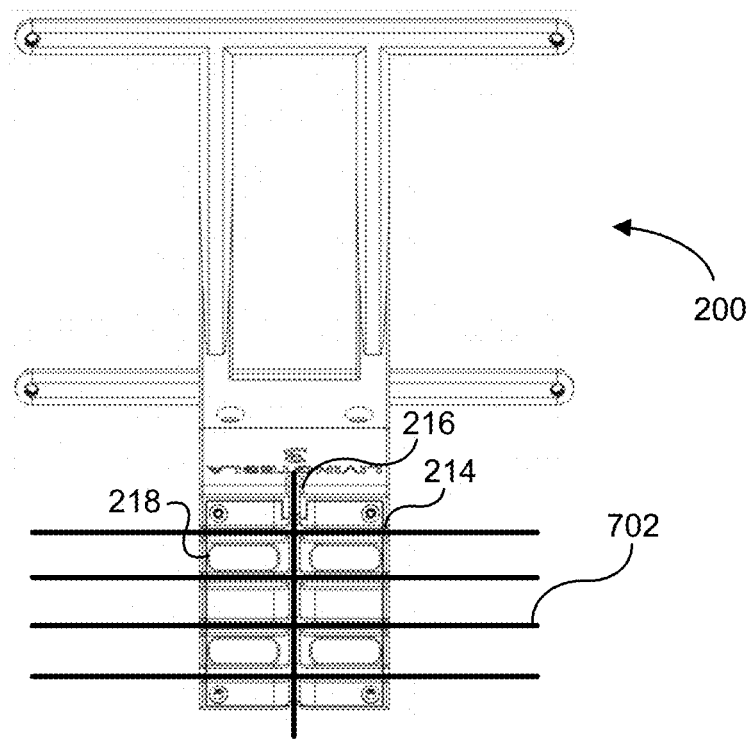
FIG. 7A illustrates a rear view of a license plate mount aligned with a motor vehicle grille and in a disengaged position, in accordance with the disclosed technology.
Figure 7B:
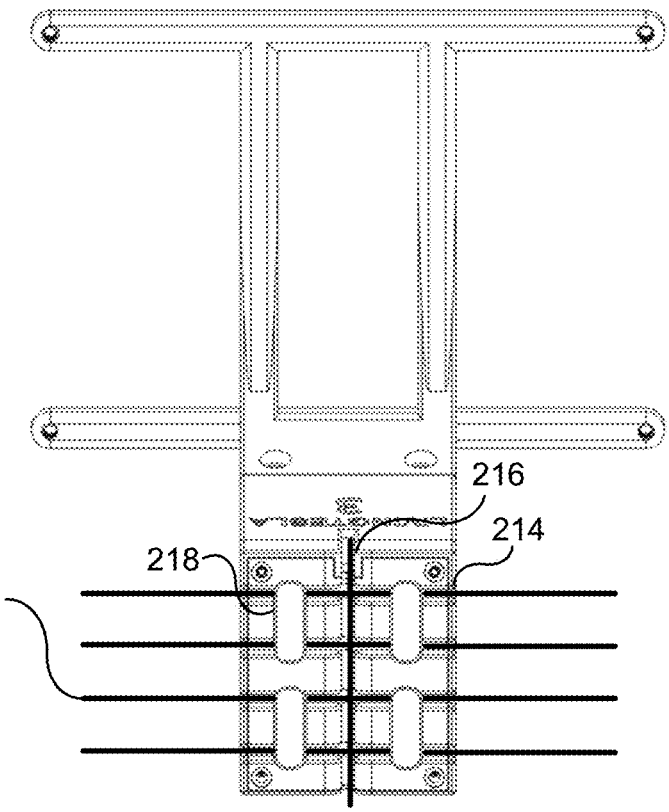
FIG. 7B illustrates a rear view of a license plate mount aligned with a motor vehicle grille and in a engaged position, in accordance with the disclosed technology.

FIG. 7A illustrates a rear view of a license plate mount 200 aligned with a motor vehicle grille 702 and in a disengaged position, whereas FIG. 7B illustrates a rear view of a license plate mount 200 aligned with a motor vehicle grille 702 and in an engaged position, in accordance with the disclosed technology. As depicted in FIGS. 7A and 7B, and as previously described, the license plate mount 200 can be aligned with a motor vehicle grille 702 such that the horizontal base alignment slots 214 and the vertical base alignment slots 216 can receive the motor vehicle grille 702. When in the disengaged position, the base mounting brackets 218 can be positioned such that the motor vehicle grille 702 can be inserted into the horizontal base alignment slots 214 and the vertical base alignment slots 216 without obstruction (as depicted in FIG. 7A). Furthermore, when in the engaged position, the base mounting brackets 218 can be positioned such that the motor vehicle grill 702 is prevented from being removed from the horizontal base alignment slots 214 and the vertical base alignment slots 216 and the license plate mount 200 is securely attached to the motor vehicle grille 702 (as depicted in FIG. 7B).

Figure 8:
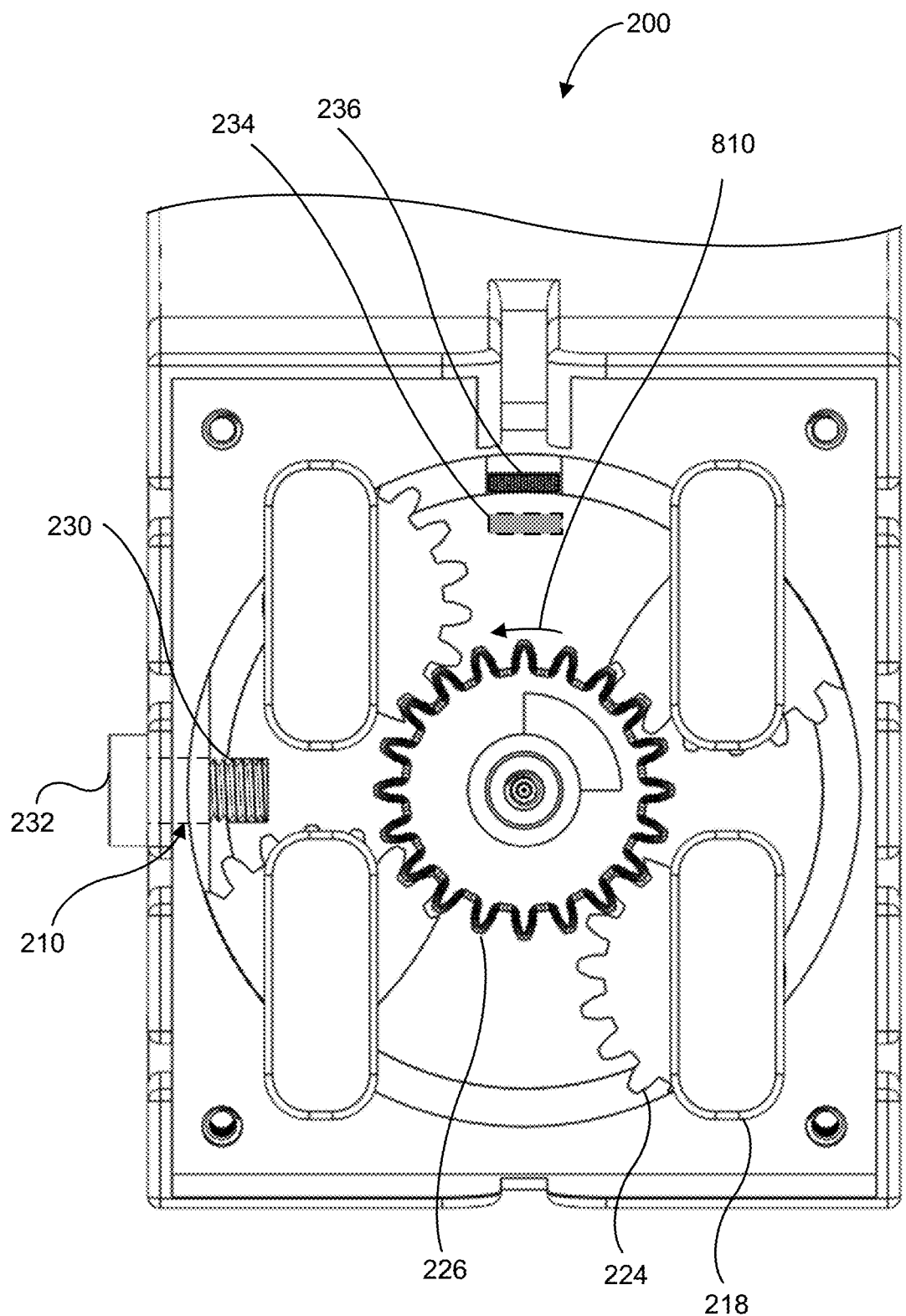
FIG. 8 illustrates a rear detail view of a license plate mount showing the mounting gear assembly, in accordance with the disclosed technology.

FIG. 8 illustrates a rear detail view of a license plate mount 200 showing the mounting gear assembly 600, in accordance with the disclosed technology. As will be appreciated, the base end plate 220 is not shown in FIG. 8 so that the mounting gear assembly 600 can be fully viewed. Furthermore, the base mounting brackets 218 are shown in the engaged position with an arrow 810 depicting the direction the center gear 226 would need to turn to move to the disengaged position.

As can be viewed in FIG. 8, and as previously described, the outer gears 224 can be aligned with the center gear 226 such that the gear teeth of the outer gears 224 contact the gear teeth of the center gear 226. Thus, when the center gear 226 is rotated, the center gear 226 can cause travel to the outer gears 224 which can in turn cause travel of the base mounting brackets 218 between the engaged position and the disengaged position. Furthermore, as can be seen in FIG. 8, the outer gears 224 can be sized such that a portion of the outer gears 224 without gear teeth can contact an inner surface of the base 202 when in the engaged position and another portion of the outer gears 224 without gear teeth can also contact the inner surface of the base 202 when in the disengaged position. In this way, the outer gears 224 can help to further limit travel of the base mounting brackets 218 between the engaged position and the disengaged position.

As can be seen in FIG. 8, the locking mechanism slot 230 can be configured to align with the locking mechanism aperture 210 such that a locking mechanism 232 can be inserted into the locking mechanism aperture 210 and the locking mechanism slot 230 when the base mounting brackets 218 are in the engaged position. The locking mechanism 232 can be a fastener, a pin, a rod, or other device sized to fit into the locking mechanism aperture 210 and the locking mechanism slot 230 to prevent rotation of the base mounting brackets 218. The locking mechanism 232 can further include an interface, such as a screw head, that includes a drive having a unique shape made to interface only with a designated tool. For example, the locking mechanism 232 can include a screw head having a unique, non-standard, or custom drive shape such that the locking mechanism 232 can only be removed with a corresponding screwdriver or other tool made to fit the unique, non-standard, or custom drive of the screw head. In this way, the locking mechanism 232 is less likely to be removed by a thief or other ill-intentioned individual.

To further prevent the base mounting brackets 218 from moving between the engaged position and the disengaged position, the rotation interface 208 can include a magnetic device 234 configured to exert an attractive force on a corresponding magnetic device 236 mounted on the base 202. The magnetic device 234 can be installed on the rotation interface 208 in a position where the magnetic device 234 only comes into proximity to the corresponding magnetic device 236 when the rotation interface 208 is in the engaged position. By including the magnetic device 234 on the rotation interface 208 and the corresponding magnetic device 236 on the base 202, the magnetic device 234 and the corresponding magnetic device 236 can be attracted to each other when brought within proximity to each other. When the magnetic device 234 and the corresponding magnetic device 236 are brought within proximity to each other and a resultant attractive force is created, the magnetic device 234 and the corresponding magnetic device 236 can create an attractive force that can prevent the rotation interface 208 from being rotated from the engaged position to the disengaged position. In this way, the license plate mount 200 can be secured to the motor vehicle 100 when in the engaged position. For example, the magnetic device 234 and the corresponding magnetic device 236 can help prevent the license plate mount 200 from unintended rotation caused by forces experienced while the motor vehicle 100 is operating.

FIG. 9A and FIG. 9B illustrate a rear isometric view of a license plate mount 200 having alternative objects attached thereto, in accordance with the disclosed technology. As will be appreciated, the license plate mount 200 can be configured to have additional objects attached to it other than a license plate. In the example depicted in FIG. 9A, the license plate mount 200 can be configured to have an identification transponder 902 attached to it. The identification transponder 902 can be a device configured to transmit identification data of the vehicle, the owner of the vehicle, and/or the driver of the vehicle. For example, the identification transponder 902 can be a toll transponder to transmit identification data to a toll road booth or toll road device. In other examples, the identification transponder 902 can be a device configured to transmit identification data to a security gate, a garage door, a parking structure, a law enforcement device, or other device that can be used to receive identification data from the identification device. Furthermore, although depicted as being attached to the support bracket 204 of the license plate mount 200, the license plate mount 200 can be configured to have the identification transponder 902 attached to the base 202 or another component of the license plate mount 200.

In another example, the license plate mount 200 can be configured to have a light 904 affixed to it. For example, the light 904 can be configured to illuminate the license plate mounted to the license plate mount 200. As another example, the light 904 can be an auxiliary light configured to provide light in addition to the head lights or other auxiliary light. The light 904 can be a light emitting diode (LED), a fluorescent light, an incandescent light, or any other type of light suitable for the application. Furthermore, the light 904 can be powered by a battery 906 or power generated by the vehicle (e.g., the vehicle's battery, the alternator, etc.). Furthermore, although depicted as being attached to the support bracket 204 of the license plate mount 200, the license plate mount 200 can be configured to have the light 904 and/or battery 906 attached to the base 202 or another component of the license plate mount 200.

Figure 10:
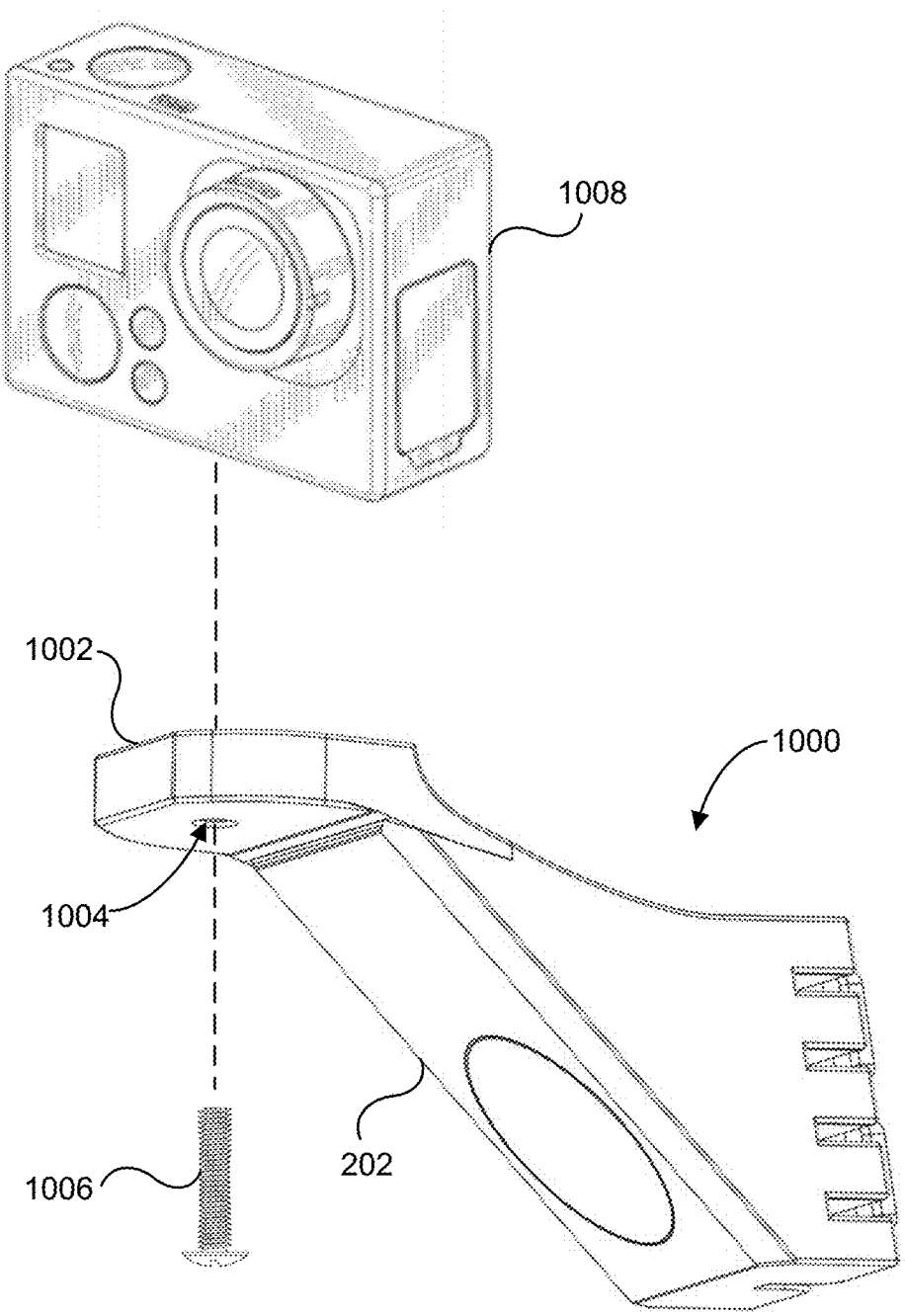
FIG. 10 illustrates a license plate mount configured to receive an auxiliary device, in accordance with the disclosed technology.

As will be appreciated by those of skill in the art, and as previously described, the license plate mount 200 can be a multi-function mount 1000 configured to support objects other than a license plate. FIG. 10 illustrates an example multi-function mount 1000 configured to receive an auxiliary device 1008 other than a license plate. As depicted in FIG. 10, the auxiliary device 1008 can be a camera, but the present disclosure is not so limited. The auxiliary device 1008, for example, can be an identification transponder (e.g., identification transponder 902), various sensors, marketing materials, auxiliary lighting, and/or other objects that a user would wish to mount to his or her motor vehicle.

The multi-function mount 1000 can include a mounting platform 1002 having a mount aperture 1004. The mounting platform 1002 can be configured to attach to the base 202 and support the auxiliary device 1008. Furthermore, the mount aperture 1004 can be configured to receive a fastener 1006 or other mounting device to secure the auxiliary device 1008 to the multi-function mount 1000. As will be appreciated, the mounting platform 1002 can comprise various shapes, sizes, or configurations to support whatever auxiliary device 1008 a user wishes to mount on the multi-function mount 1000. Furthermore, the mounting platform 1002 can be configured to be removed from the base 202 such that various mounting platforms 1002 of different shapes and sizes and/or the support bracket 204 can be installed on the base as desired. The mount platform 1002, can be configured to be removed from, and attached to, the base 202 by, for example, fasteners, snap-connections, hook-and-loop fasteners, magnetic fasteners, a press fit, or any other means of attachment suitable for the application.

Figure 11A:
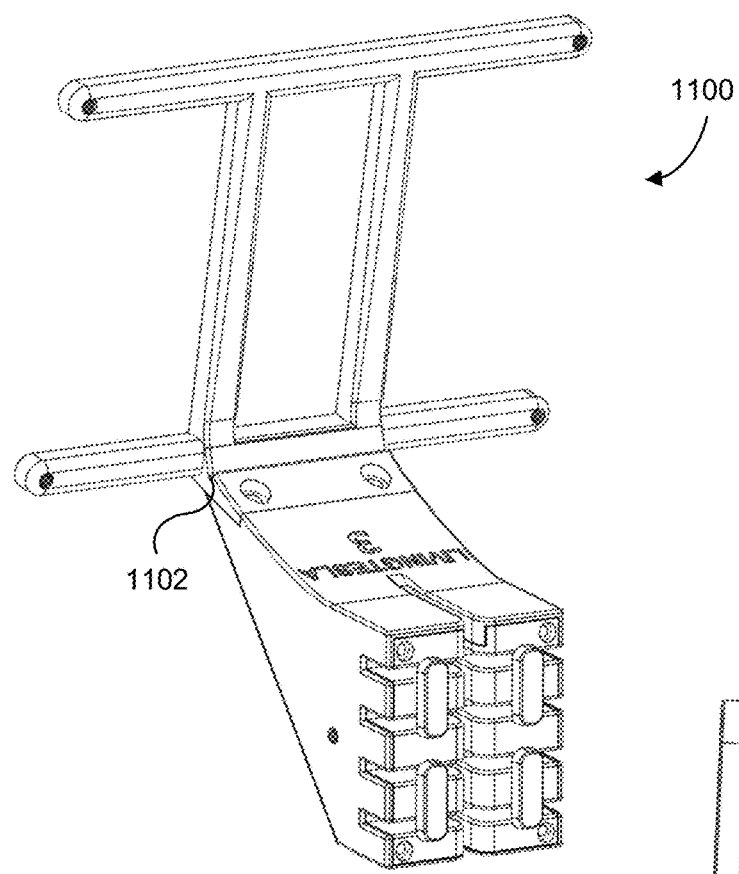
FIG. 11A and FIG. 11B illustrate perspective views of a license plate mount including a breakaway mount, in accordance with the disclosed technology.
Figure 11B:
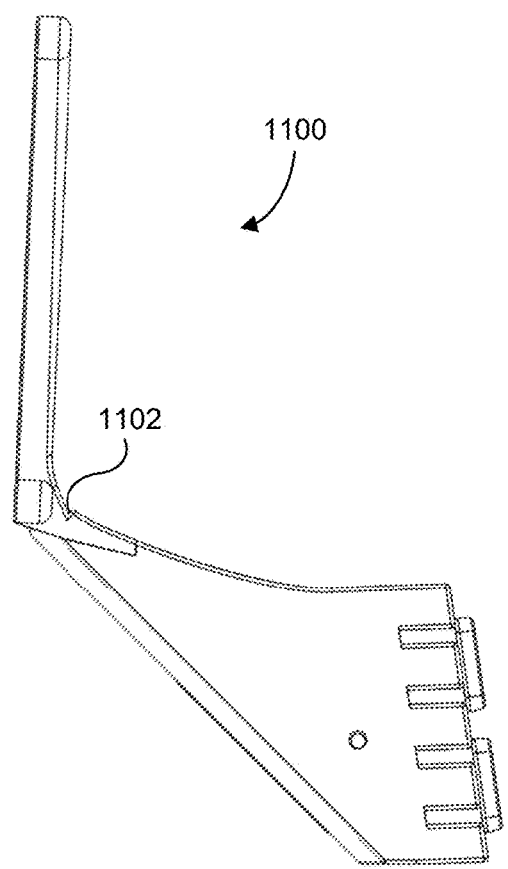

As another example, FIG. 11A illustrates a license plate mount 1100 having a breakaway mount 1102, in accordance with the disclosed technology. As depicted in FIG. 11A, the license plate mount 1100 can further include a breakaway mount 1102 that can be an alternative example of the support bracket 204 attached to the base 202. The breakaway mount 1102 can be strong enough to support an object attached to the breakaway mount 1102 while also being weak enough to break away (or detach) from the base 202 if a sufficient force is applied to the breakaway mount 1102 (e.g., when someone bumps or snags the license plate when walking past the front of the motor vehicle 100, automated car washes, or minor parking accidents). As an example, the breakaway mount 1102 can include a notch as depicted in FIG. 11A or the breakaway mount 1102 can include a weaker portion of material, a section including a different material, fasteners configured to break under a force, or any other configuration capable of allowing the breakaway mount 1102 to breakaway (or detach) from the base 202 when a force is applied. The breakaway mount 1102 can be configured to breakaway (or detach) from the base 202 at a force that is less than a force that could damage a grille or other mounting surface of the motor vehicle 100, as would be understood by one of skill in the art. In this way, the breakaway mount 1102 can prevent damage to the motor vehicle 100 when a force is applied to an object attached to the breakaway mount 1102 or to the breakaway mount 1102 itself. Furthermore, the breakaway mount 1102 can be configured such that a damaged breakaway mount 1102 can be removed from the base 202 and a replacement breakaway mount 1102 can be mounted to the base 202. In other examples, the breakaway mount 1102 can be configured to receive other attachment configuration such that the base 202 can be used to support other objects or items other than a license plate (e.g., a toll transponder, a light, a camera, sensors, etc.) such as the other examples discussed herein. FIG. 11B depicts an alternative view of license plate mount 1100.

Figure 12:
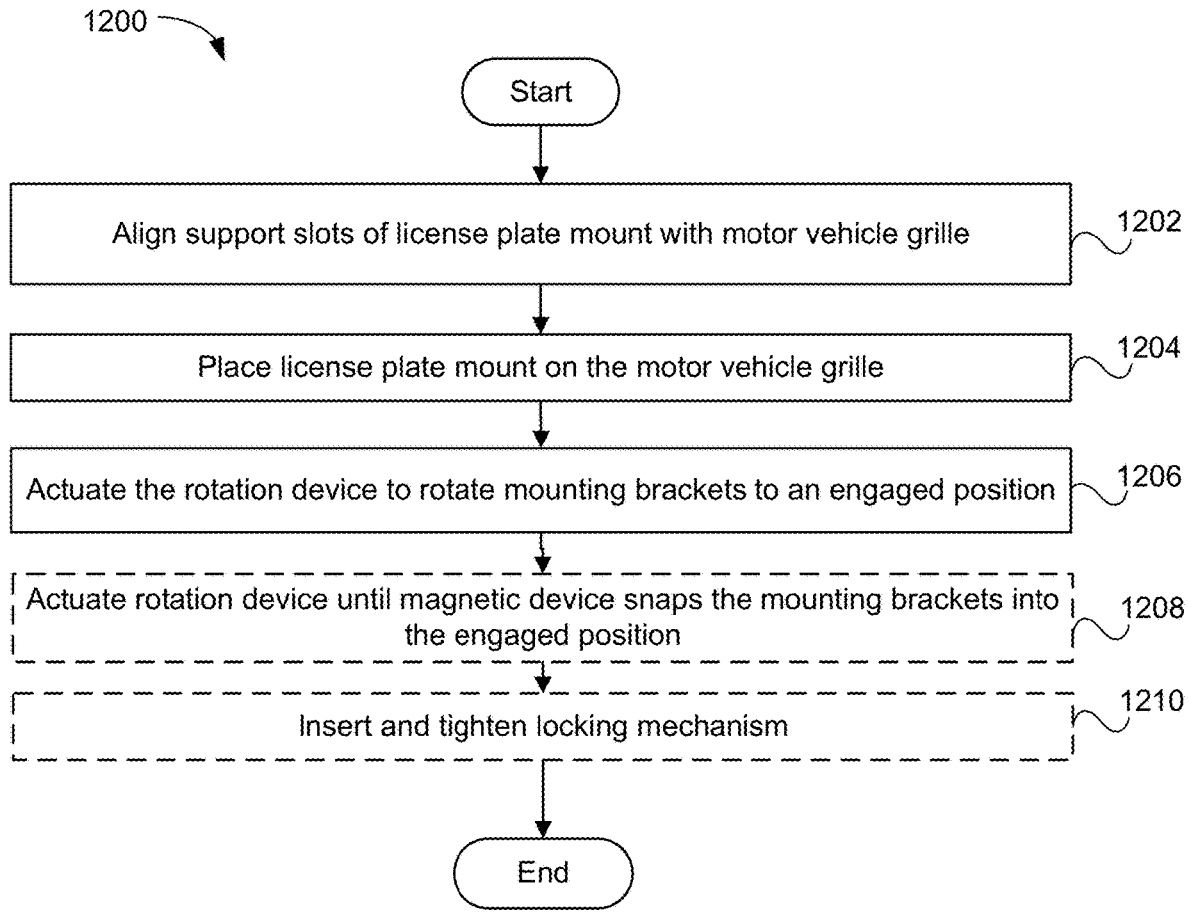
FIG. 12 illustrates a flowchart of a method of attaching a license plate mount to a motor vehicle, in accordance with the disclosed technology.

FIG. 12 illustrates a flowchart of a method 1200 of attaching a license plate mount (e.g., license plate mount 200 and/or multi-function mount 1000) to a motor vehicle, in accordance with the disclosed technology. The method 1200 can include aligning 1202 support slots (e.g., horizontal base alignment slots 214 and vertical base alignment slots 216) of the license plate mount with a vehicle grille or other attachment surface of a motor vehicle. The method 1200 can further include placing 1204 the license plate mount onto the motor vehicle grille. The method 1200 can also include actuating 1206 the rotation device (e.g., rotation interface 208) to rotate mounting brackets (e.g., mounting brackets 218) to an engaged position. Alternatively, or in addition, the method 1200 can include actuating the rotation device until a magnetic retainer (e.g., magnetic device 234 and corresponding magnetic device 236) snap the mounting brackets into the engaged position. Alternatively, or in addition, the method 1200 can also include inserting 1208 and tightening a locking mechanism (e.g., locking mechanism 232) to keep the license plate mount attached to the motor vehicle grille.

Figure 13:
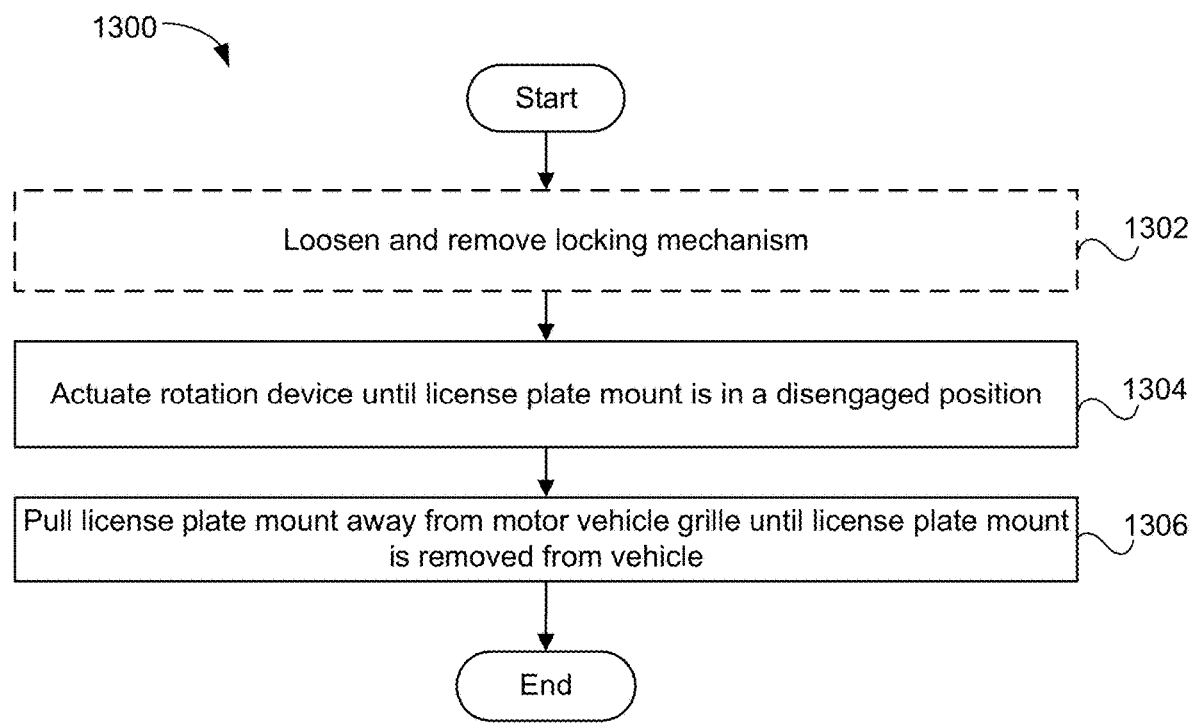
FIG. 13 illustrates a flowchart of a method of detaching a license plate mount to a motor vehicle, in accordance with the disclosed technology.

FIG. 13 illustrates a flowchart of a method 1300 of detaching a license plate mount (e.g., license plate mount 200) from a motor vehicle, in accordance with the disclosed technology. The method 1300 can optionally include loosening 1302 and removing a locking mechanism (e.g., locking mechanism 232 if a locking mechanism is installed. The method 1300 can further include actuating 1304 a rotation device (e.g., rotation interface 208) until the license plate mount is in a disengaged position and pulling 1306 the license plate mount away from the motor vehicle grille until the license plate mount is removed from the motor vehicle.

As will be appreciated, the methods 1200 and 1300 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A mounting device for a motor vehicle, the mounting device comprising:
   a base having one or more slots configured to receive a component of a motor vehicle grille;
   a support bracket affixed to the base and dimensioned to receive an object; and
   a rotational mounting device attached to the base and comprising:

a rotation interface, the rotation interface being rotatably actuatable;

a plurality of mounting brackets configured to attach the base to the motor vehicle grille when the plurality of mounting brackets are in an engaged position; and a plurality of gears in mechanical communication with the rotation interface, each gear in the plurality of gears in mechanical communication with a respective mounting bracket of the plurality of mounting brackets, wherein respective gears of the plurality of gears are configured to rotate respective mounting brackets of the plurality of mounting brackets between the engaged position and a disengaged position when the rotation interface is rotatably actuated.

2. The mounting device of claim 1, wherein the support bracket is dimensioned to receive a motor vehicle license plate.

3. The mounting device of claim 1, wherein:
the rotation interface further comprises a rotation restriction tab; and
the base further comprises a rotation restriction slot, wherein the rotation restriction slot is configured to receive the rotation restriction tab and limit a rotational travel of the rotation interface when the plurality of mounting brackets are rotated between the engaged position and the disengaged position.

4. The mounting device of claim 1, wherein:
the rotation interface further comprises a magnetic device; and
the base further comprises a corresponding magnetic device, wherein the magnetic device and the corresponding magnetic device are configured to be aligned and exert an attractive force on each other when the plurality of mounting brackets are in the engaged position such that the plurality of mounting brackets are prevented from moving to the disengaged position when the plurality of mounting brackets are in the engaged position.

5. The mounting device of claim 1, wherein:
the rotation interface further comprises a locking mechanism slot; and
the base further comprises a locking mechanism aperture, wherein the locking mechanism aperture and locking mechanism slot are configured to receive a locking mechanism when the plurality of mounting brackets are in the engaged position such that the plurality of mounting brackets are prevented, by the locking mechanism, from moving to the disengaged position when the plurality of mounting brackets are in the engaged position.

6. The mounting device of claim 5, wherein the locking mechanism comprises a threaded fastener having a head adapted to receive a unique drive of a screwdriver.

7. The mounting device of claim 1, wherein the support bracket is configured to detach from the base when a force is applied to the support bracket before the component of the motor vehicle grille is damaged.

8. The mounting device of claim 1, wherein the plurality of mounting brackets comprise four mounting brackets.

9. The mounting device of claim 1, further comprising a light configured to illuminate an object attached to the support bracket.

10. The mounting device of claim 1, wherein the support bracket is dimensioned to receive an identification transponder.

11. The mounting device of claim 1, wherein the support bracket is dimensioned to receive a camera.

12. The mounting device of claim 1, wherein the one or more slots comprises one or more horizontal slots and one or more vertical slots.

13. The mounting device of claim 12, wherein the one or more horizontal slots comprises four horizontal slots and the one or more vertical slots comprises one vertical slot.

14. The mounting device of claim 1, wherein the rotation interface comprises a knob configured to be rotated by a user and wherein an outer surface of the rotation interface is configured to be approximately flush with a surface of the base when the mounting brackets are in the engaged position.

15. A mounting device for a motor vehicle, the mounting device comprising:
a base having one or more slots configured to receive a component of a motor vehicle grille;
a support bracket affixed to the base and dimensioned to receive a motor vehicle license plate; and
a rotational mounting device attached to the base and comprising:
a rotation interface, the rotation interface being rotatably actuatable;
a mounting bracket configured to attach the base to the motor vehicle grille when the mounting bracket is in an engaged position;
a first gear attached to the rotation interface; and
a second gear attached to the mounting bracket and in mechanical communication with the first gear,
wherein the first gear and the second gear are configured to rotate the mounting bracket between the engaged position and a disengaged position when the rotation interface is rotatably actuated.

16. The mounting device of claim 15, wherein:
the rotation interface further comprises a rotation restriction tab; and
the base further comprises a rotation restriction slot, wherein the rotation restriction slot is configured to receive the rotation restriction tab and limit a rotational travel of the rotation interface when the mounting bracket is rotated between the engaged position and the disengaged position.

17. The mounting device of claim 15, wherein:
the rotation interface further comprises a magnetic device; and
the base further comprises a corresponding magnetic device, wherein the magnetic device and the corresponding magnetic device are configured to be aligned and exert an attractive force on each other when the mounting bracket is in the engaged position such that the mounting bracket is prevented from moving to the disengaged position when the mounting bracket is in the engaged position.

18. The mounting device of claim 15, wherein:
the rotation interface further comprises a locking mechanism slot; and
the base further comprises a locking mechanism aperture, wherein the locking mechanism aperture and locking mechanism slot are configured to receive a locking mechanism when the mounting bracket is in the engaged position such that the mounting bracket is prevented, by the locking mechanism, from moving to the disengaged position when the mounting bracket is in the engaged position.

19. The mounting device of claim 15, wherein the support bracket is configured to detach from the base when a force is applied to the support bracket before the component of the motor vehicle grille is damaged.

* * * * *